Figure 1:
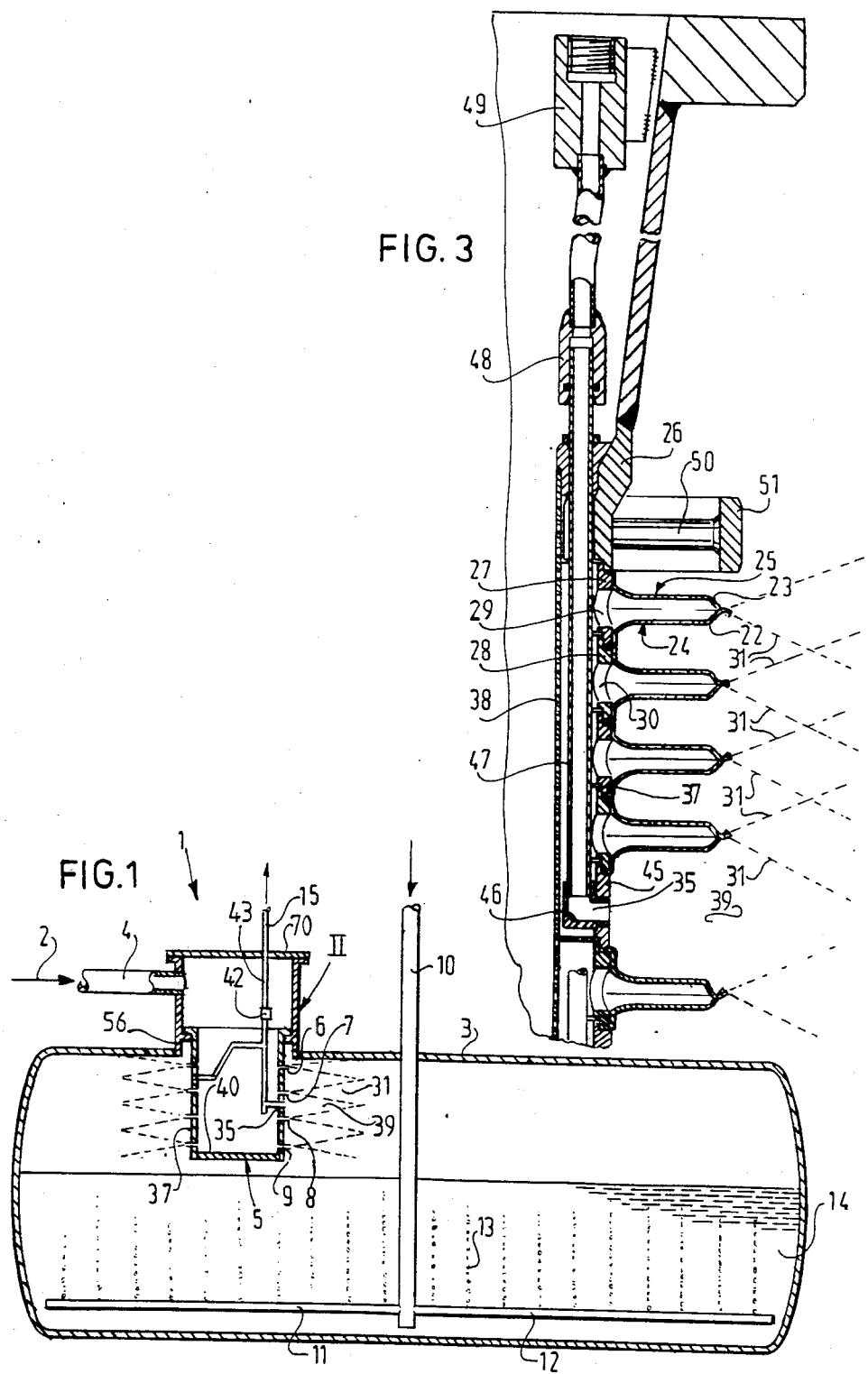

United States Patent [19]

Kreuwel et al.

[11] Patent Number: 4,701,191
[45] Date of Patent: Oct. 20, 1987

[54] SPRAY UNIT AND DEGASSING INSTALLATION

[75] Inventors: Johannes G. Kreuwel, Delden; Lambert A. Schipper, Hengelo, both of Netherlands

[73] Assignee: Stork Ketels B.V., Netherlands

[21] Appl. No.: 907,393

[22] Filed: Sep. 15, 1986

[30] Foreign Application Priority Data

Sep. 20, 1985 [NL] Netherlands ............... 8502592

[51] Int. Cl.$^4$ ............................................. B01D 47/02
[52] U.S. Cl. ........................................ 55/198; 55/201
[58] Field of Search .................. 55/54, 190, 198, 201

[56] References Cited

U.S. PATENT DOCUMENTS 1,552,071  9/1925  McDermet .................. 55/198
4,062,661  12/1977  Wiemer et al. ............. 55/190

Primary Examiner—Bernard Nozick
Attorney, Agent, or Firm—John P. Snyder

[57] ABSTRACT

When a ring is placed between two sets of spray plates which bring about intersecting spray surfaces and when said ring has at least one gas passage which is connected onto a gas outlet line, there is not required a splash grid. This does not only save the splash grid but also the welding operation for connecting the grid to the device wall.

8 Claims, 3 Drawing Figures

SPRAY UNIT AND DEGASSING INSTALLATION

The invention relates to a spray unit for supplying liquid for degassing in finely divided state, comprising a duct shaped liquid feed chamber which is connectable to a supply of the liquid for degassing that in under pressure, whereby a casing of the liquid fee chamber is provided with a plurality of sets of spray plates extending in circumferential direction of the casing and providing slit shaped spray apertures, such that a number of intersecting spray surfaces are formed.

Such a spray unit is known from the Dutch patent specification No. 163,726 (see U.S. Pat. No. 4,062,661). Owing to their construction and operational advantages, such spray units are widely used in degassing installations. The spray units are thereby attached for removal in a stump on the upper side of a degassing installation, whereby the stump is provided with a closing cover and a connection to the supply of water for degassing. In the degassing installation under the spray unit is a quantity of water into which is fed finely divided steam which bubbles up through the water carrying with it air and other non-condensable gases still present therein. These sprays fulfil two functions in a degasser:

1. With the spraying of the boiler feed water which is fed in relatively cold, the outflow of air and other non-condensable gases dissolved in the water is stimulated by the formation of fine droplets, and effected by the creation of a large outflow surface.

2. The steam bubbling up out of the water at the bottom of the boiler and the air and non-condensable gases thereby carried with it are guided through the relatively cold spray vapour so that the steam condenses.

Facilities must therefore be arranged in the degassing reservoir to guide this steam, air and the non-condensable gases through the spray vapour, as well as facilities for drawing off the released air and other gases.

Known for this purpose is the concentric arrangement around the sprayer of a cylinder—the so-called splash grid—attached to the upper side of the degassing reservoir and open at the lower end such that the spray vapour comes into contact with the inner wall of this cylinder, while one or more gas outlets are arranged in the wall of the reservoir above the sprayer inside the splash grid. The fitting of these facilities is laborious in construction, while particularly in installations which can possibly contain radio-active water, such as in nuclear power stations, the number of welds and bushings has to be restricted as much as possible from considerations of safety.

The invention has for its object to lessen or avoid the drawbacks of the splash grid. According to the invention a ring is placed for this purpose at least between two sets of spray plates which bring about intersecting spray surfaces, said ring having at least one gas passage which is connected onto a gas outlet line. In accordance with the invention the splash grid and therefore also the welding involved can become unnecessary.

If an outlet pipe linked to the gas passage is located in a space bounded by the annular plates and a filter fitted between the spray unit and the annular plates, a standard filter can be used, without a passageway through this filter having to be arranged for the gas outlet member. The filter can moreover be replaced in a simple manner.

A particularly simple, modular system results if the ring provided with the gas passage and the annular plates are arranged coaxially and are tightened unto a spray unit wall through the interposition of retaining rings and with the aid of attaching means.

In addition the invention relates to and provides a degassing installation comprising a degassing reservoir to be partly filled with water having at least one stump arranged on the upper part of the degassing reservoir, in which stump at least one spray unit according to the invention is accomodated so as to be removable, which stump is closed off with a releasable cover and is provided with a connection to a supply of water for degassing, and which degassing installation is provided on the upper side of the degassing reservoir with at least one outlet. This degassing installation has the feature that the gas outlet is arranged beneath the closing cover of the stump and is connected to a rigid conduit system which is provided at an open end of the liquid feed chamber with a connecting coupling which co-operates with the end of the exhaust pipe of the gas outlet system arranged in the spray unit.

Mentioned and other characteristics will be further elucidated on the basis of an embodiment of a degassing apparatus which is provided with a spray unit according to the invention, with reference to the appended drawing.

Figure 2:
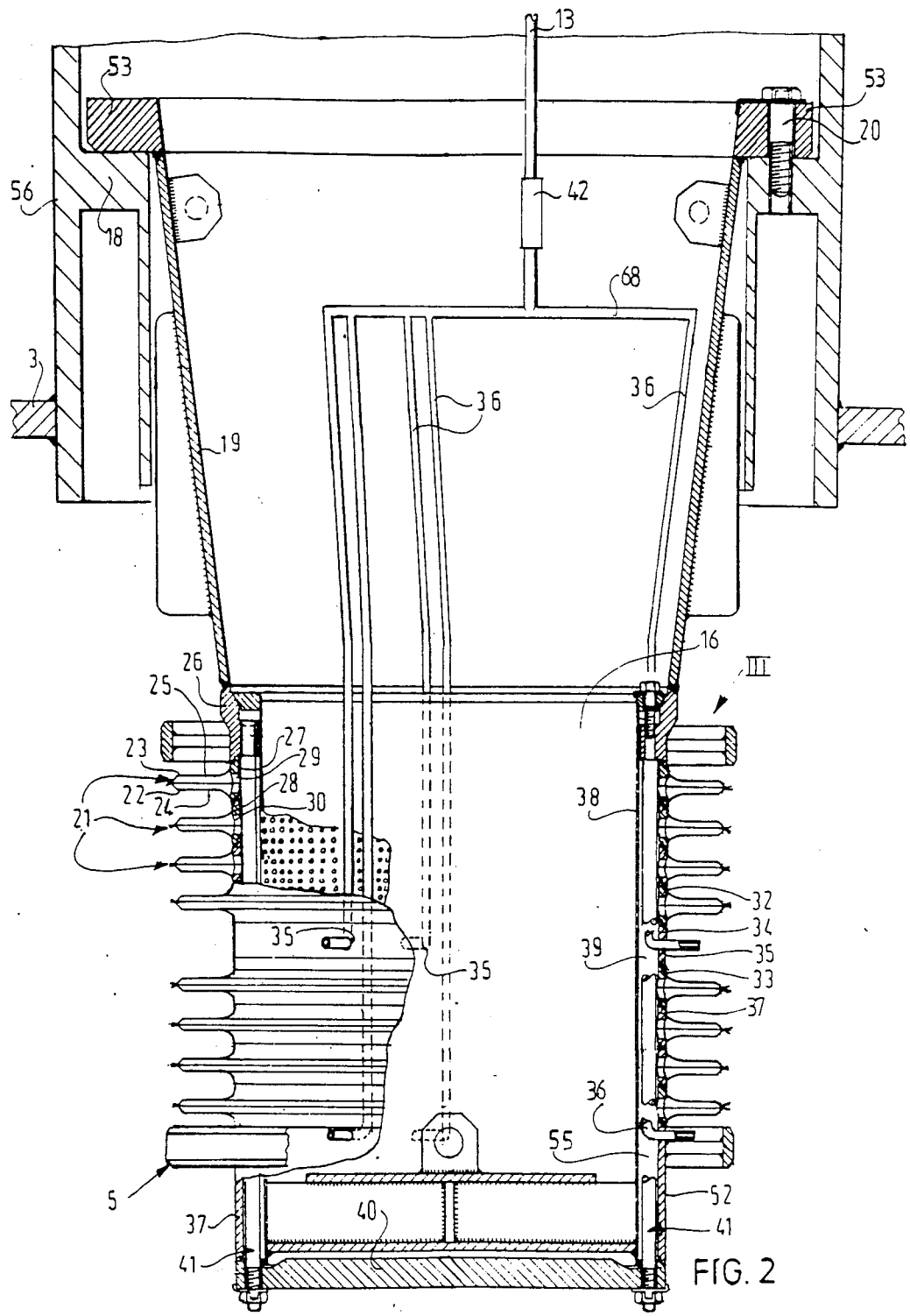

In the drawing shows:

FIG. 1 a section through the degassing installation having a spray unit according to the invention, FIG. 2 detail II from FIG. 1, partly in section and on a large scale, and FIG. 3 a variant of detail III from FIG. 2 on another scale.

FIG. 1 shows a degassing installation 1 in accordance with the invention for degassing liquid 2. The degassing installation 1 comprises a spray unit 5 according to the invention arranged in a stump 56 of a degassing reservoir 3, provided with a liquid feed chamber 4 and having liquid spray members 6–9 arranged in different layers.

Degassing installation 1 is further provided with a steam inlet 10, with which steam is introduced in the form of fine steam bubbles 13 via lines 11 and 12 provided with apertures into water 14 present at the bottom of degassing reservoir 3.

Escaping gases are drawn off via a gas outlet member 15 accomodated in spray unit 5. Spray unit 5 and gas outlet member 15 are jointly arranged in stump 56 fitted in degassing reservoir 3.

FIG. 2 shown in more detail spray unit 5 according to the invention. Stump 56 is provided with an interior flange 18 onto which a tubular part 19 of a duct shaped feed chamber 16 is attached for removal with the aid of a flange 53 and bolts 20.

Spray units 21 consists of co-operating annular spray plates 24 and 25 provided with lips 22 and 23. Spray plate 25 is clamped between a fitting ring 26 and a ring 27. Spray plate 24 is clamped between ring 27 and a ring 28 situated beneath it. Rings 27 and 28 are each provided with liquid passages 29, 30 which emerge into a space bounded by lips 22, 23, out of which space two conical liquid spray surfaces 31 are formed in degassing reservoir 3 from between lips 22, 23.

Between ring 32 and ring 33, which are each provided with spray units, a ring 34 is arranged concentrically which is provided over the ring circumference with gas passages 35 arranged therein radially, which thereby emerge into a space 39 located outside rings 45 which is bounded by intersecting conical liquid spray surfaces 31 situated above one another and by spray unit wall 37.

Each gas passage 35 is connected with a gas outlet pipe 36 which is located in a space 55 between a filter 38 on one side and spray unit wall 37 on the other.

The bottom end of spray unit 5 is closed with a base plate 40. Using attaching means 41, rings 26, 27, 28, 32, 33, 34 and a fitting ring 52 are tightened onto tubular part 19 which is attached to degassing reservoir 3.

Gas outlet pipes 36 are connected via disconnectable couplings 42 with fixed conduits 43 so that spray unit 5 can be removed and replaced as a separate unit.

Gas outlet pipes 36 are connected to a common main gas outlet pipe which is connected with a disconnectable coupling 42 with fixed conduit 43 which entends through a removable cover 70 of stump 56.

FIG. 3 shows another embodiment in which gas passages 35, which are arranged in a ring 45, emerge into a ring line 46 having only one gas outlet pipe 47 which in turn is connected via a single coupling 48 with a rigid piece 49.

Fitting ring 26 is coupled via radially projecting fingers 50 with a protection ring 51 which shields the spray dishes during the insertion of spray unit 5 into and its removal from stump 56 of degassing reservoir 3.

What is claimed is:

1. A degassing spray unit comprising the combination of a stack of separate rings and a bottom plate closing off the bottom of the stack of rings, means for holding the stack of rings and the bottom plate together to form a unit having a generally cylindrical wall, there beings pairs of adjacent rings presenting outwardly projecting plates having mutually bent outer peripheries defining slit-like spray apertures, and degassing conduit means within said stack for directing gas inwardly through the wall adjacent to some of said pairs of adjacent rings to a point of discharge, said degassing conduit means having a coupling member at said point of discharge to permit the unit to be removed and replaced in a degassing assembly.

2. A degassing spray unit as defined in claim 1 including a generally cylindrical filter lining said stack.

3. A degassing spray unit as defined in claim 1 including a generally frusto-conical tubular member joined to the uppermost ring of the stack and projecting upwardly thereof, said tubular member terminating at its top in a supporting flange by which the unit may be suspended in a degassing assembly.

4. A degassing spray unit as defined in claim 3 wherein said coupling member is located within the confines of said tubular member.

5. A degassing assembly comprising the combination of a tank for controlling boiler feed water, said tank having a tubular collar provided with a supporting flange therein, a spray unit suspended from said supporting flange and projecting downwardly into said tank toward the level of boiler feed water therein, the spray unit comprising the combination of a stack of separate rings and a bottom plate closing off the bottom of the stack of rings, means for holding the stack of rings and the bottom plate together to form a unit having a generally cylindrical wall, there beings pairs of adjacent rings presenting outwardly projecting plates having mutually bent outer peripheries defining slit-like spray apertures, and degassing conduit means within said stack for directing gas inwardly through the wall adjacent to some of said pairs of adjacent rings to a point of discharge, said tubular collar having a removable cover plate, inlet means for discharging relatively cool boiler feed water into the interior of the spray unit, means for bubbling steam upwardly through the boiler feed water in the tank, said degassing conduit means having a coupling member at said point of discharge and there being further conduit means with a coupling member carried by and projecting through said cover plate.

6. A degassing assembly as defined in claim 5 including a generally cylindrical filter lining said stack.

7. A degassing spray unit as defined in claim 5 including a generally frusto-conical tubular member joined to the uppermost ring of the stack and projecting upwardly thereof, said tubular member terminating at its top in a supporting flange by which the unit is suspended from the flange of said collar.

8. A degassing spray unit as defined in claim 7 wherein said coupling member is located within the confines of said tubular member.

* * * * *